United States Patent
Lee et al.

(10) Patent No.: US 6,870,955 B2
(45) Date of Patent: Mar. 22, 2005

(54) METHOD FOR DECIDING SEMI-S CURVE FOR TONE PROCESS OF A DIGITAL COLOR IMAGE

(75) Inventors: Jyh-Jiun Lee, Hsinchu (TW); Chun-Yen Chen, ChangHua (TW)

(73) Assignee: Industrial Technology Research Institute, Hsinchu (TW)

( * ) Notice: Subject to any disclaimer, the term of this patent is extended or adjusted under 35 U.S.C. 154(b) by 647 days.

(21) Appl. No.: 09/922,854

(22) Filed: Aug. 7, 2001

(65) Prior Publication Data

US 2002/0141638 A1 Oct. 3, 2002

(30) Foreign Application Priority Data

Feb. 1, 2001 (TW) ........................................ 90101981 A (51) Int. Cl.⁷ ................................................. G06K 9/00
(52) U.S. Cl. ...................... 382/165; 382/165; 382/169; 382/274; 345/589; 345/617
(58) Field of Search ................................ 382/274, 162, 382/165–169, 172, 254; 345/589, 617, 20, 63, 77, 597, 690; 348/251, 254, 603; 358/461, 522, 1.9, 2.1, 3.27, 447

(56) References Cited

U.S. PATENT DOCUMENTS 5,854,851 A * 12/1998 Bamberger et al. .......... 382/132
2001/0046320 A1 * 11/2001 Nenonen et al. ............. 382/169

OTHER PUBLICATIONS

Gonzalez et al., Digital Image Processing, 1st ed., 1993, relevant pages only.*

* cited by examiner

Primary Examiner—Bhavesh M. Mehta
Assistant Examiner—Yubin Hung
(74) Attorney, Agent, or Firm—Birch, Stewart, Kolasch & Birch, LLP (57) ABSTRACT

The present invention provides a method for processing tone scale of a digital color image in which the histogram of tone scales (for example, of RGB, $YC_rC_b$, Lab or Luv) is considered for deciding the semi-S curve. The semi-S curve suits the digital color image and improves the brightness contrast and color saturation for the image output device. A weighting procedure can also be used for compensating those high occurrence colors in the image, and rearrange and analysis the histogram of tone scale, so as to decrease the influence of the high occurrence colors to the calculation and process of tone scale.

20 Claims, 11 Drawing Sheets

Flow Chart of Image-dependent Semi-Sigmoidal Tone Curve Processing for Color Images

Fig. 1

Fig. 2 S-curve tone process

Images Before and After process

Original

Original

Images Before and After process

Fig. 9A

Original image

Images Before and After TP process

METHOD FOR DECIDING SEMI-S CURVE FOR TONE PROCESS OF A DIGITAL COLOR IMAGE

BACKGROUND OF THE INVENTION

1. Field of Invention

The present invention generally relates to a method for processing tone of a digital color image, and more particularly relates to a method for deciding a semi-S curve for processing tone of a raster digital color image according to the tone scale (e.g., RGB, $YC_rC_b$ Luv or LCH) of the image.

2. Related Art

In processing digital color image, besides the resolution as a factor directly relating to quality of image, the fidelity of color is the most important factor of all. In comparison to the control of resolution, the control of color is more complicated. The current color systems for defining color mainly include RGB (red, green, blue) primaries, HSB (hue, saturation, brightness) or LCH (lightness, chroma, hue) parameters, $YC_rC_b$, Lab, Luv, CIE XYZ color values, and CMYK (cyan, magenta, yellow, black) primaries. No matter what color system is used, human eyes are particularly sensitive to the condition of gray scale. The gray scale in RGB system is specified as tone scale, while gray scales in other color systems are defined by the brightness parameters.

Figure 2:
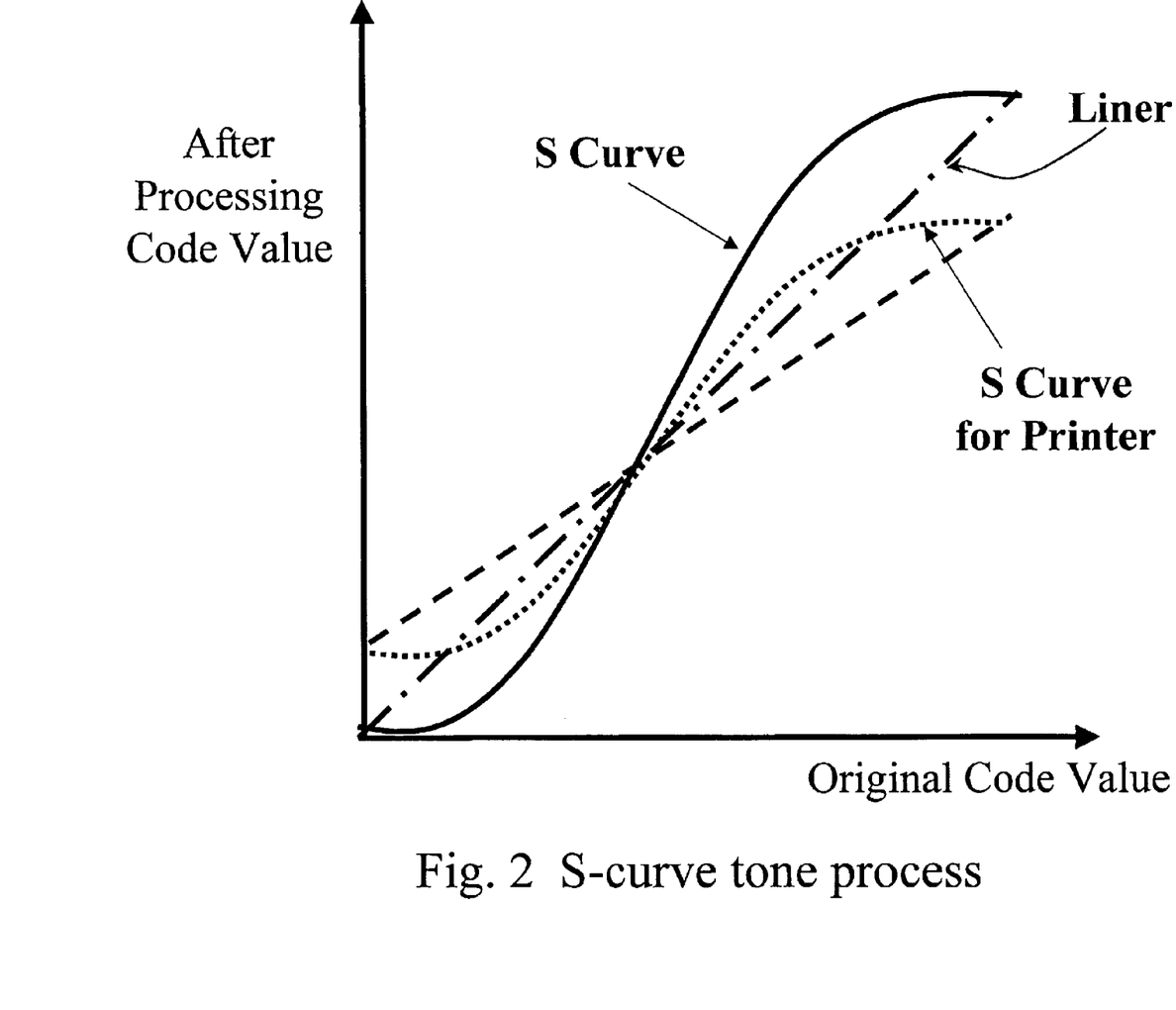
FIG. 2 is a diagram showing S curve tone process for image processing and output device (printer, display,etc.).

According to research, a digital image can be processed of its tone based on an S-shape curve, as shown in FIG. 2, in order to improve the contrast of brightness, and saturation of colors for an image output device, such as display, printer. In different color systems, the meanings of tone scale are different. For example, in the lightness, chroma, hue modes ($YC_rC_{bs}$, LCH, Lab, Luv), CIE XYZ system or CMYK system, the tone scale is the digital levels (e.g., 256 levels by 8-bit) from white to black, or digital levels of saturation. In the RGB mode, the tone scale is the digital brightness of each primary color (red, green or blue), or the brightness of the specific color. In S curve of FIG. 2, the horizontal axis represents tone scale of original image, while the vertical axis represents tone scale of processed image. In a RGB digital image, for example, the S curve process is to transform the tone scales of the red, green and blue primaries of the original into better tone scales according to the S curve. The original curve, before the process, is a 45-degree linear line shown in FIG. 2. In order to improve the result of brightness contrast and color saturation for an image output device, the tone scale curve has to be changed. A basic and effective method is using histogram equalization, which may achieve best result of contrast and saturation, but will destroy the relationships between contents of the image and makes the image unbalanced. Therefore, the S-shape tone scale process curve is recently used for improving the contrast and saturation of image for an image output device, and still mainly remaining balance of contents of the image.

Generally, an output device, such as color monitor, printer or the like, for digital image can linearly present the brightness and color saturation of the image, or an S curve can be applied for improving the contrast and saturation of the image. But, as shown in FIG. 2, different devices, such as a monitor and a printer, have their different characteristic ranges. Therefore, they need specific S curves. Prior art for the S curve process is to use a specific curve for the specific device.

But, in practice, the tone scales, for example, R, G, B tone scales for RGB digital images, are different from one another for different images. So, a fixed S curve is not suitable for processing all images.

Conventional processes using S curve for transforming tone scale are mainly in three kinds. The first kind is to use a fixed S curve without consideration of histogram of the image. This manner cannot well adjust every different image. The second kind is to provide some different kinds (for example, scenery or people) of images with different S curves. But it still cannot accommodate the specific tone scale of each image. The third kind is to provide an S curve function, such as sine curve or Gaussian function, which can be controlled with an amplitude factor for adjustment of contrast. The third manner can provide a better result. But a single S curve may not be suitable for processing whole image of unbalanced histogram. Further, human eyes will adapt the vision to the image color distribution and decrease the effects of the high occurance color in an image. The affect of human vision to the high occurance color is not considered by the prior art processes.

Therefore, we need a tone scale process method that provides a semi-S curve tone process and a weighting function for high occurance color to solve the problem.

SUMMARY OF THE INVENTION

It is therefore a primary object of the present invention to provide a method for deciding a semi-S curve for tone process according to histogram of a digital image. The semi-S curve is composed of a shadow portion color enhancement function curve and a light portion color enhancement function curve.

A further object of the present invention is to provide a method for processing tone scale of a digital image in which the histogram of tone scales (for example, of RGB, $YC_rC_b$, Lab or Luv) is considered for deciding the semi-S curve. The semi-S curve suits the digital image and improves the brightness contrast and color saturation for the image output device.

To achieve the aforesaid object, a tone process method according to the present invention includes steps of analyzing the contents of the image by the histogram; generating a semi-S curve according to the histogram analysis; and processing the tone scale of the image through the semi-S curve transformation. Therefore, the brightness contrast and color saturation of the image on the image output device can be improved.

The method of the present invention also includes a weighting function for high occurrence color (larger area of single color in the image). The weighting function considers the histogram of the high occurrence color and adjusts the tone scale for a more suitable semi-S curve to eliminate the influence of the single color with large area to the calculation and process of tone scale.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The S curves shown in FIG. 2 for tone scale processes of image output devices have been described above.

The following description for preferred embodiments of the present invention are taking images of RGB mode for examples.

The method for tone scale process according to the present invention mainly includes three steps to enhance a digital color image: converting and sampling image data, deciding a semi-S curve for tone process, and transforming the tone scale.

In the first step of converting and sampling image data, the color image of a document or object is obtained through an image-capturing device, such as scanner or digital camera. In this process, the image data can be converted to various modes (RGB, $YC_rC_b$, Luv or LCH). Then the image data distribution will be analyzed.

The second step of deciding semi-S curve for tone process is the major technique of this invention. It includes steps of: setting the weighting function of high occurrence color of an image (that is weighting process for the histogram of single color in larger area); composing new histogram of tone scale; setting a transition point for semi-S curve; and generating a look up table for tone process.

The step of analyzing the distribution of image data is to transform the image into a histogram of tone scale. The histogram is a bar chart of each tone. For an 8-bit image, 256 tones (0~255) are presented. In the histogram, horizontal axis shows the tone value (0~255), while the vertical axis shows the amount of pixels for each tone in the image.

The principle of this invention is to find out the tone scales (e.g., RGB, $YC_rC_b$, Luv or LCH), to decide a semi-S curve for tone process according to the histogram, and to process tone scale based on the semi-S curve in order to improve the contrast and saturation result of image output through the output device. The present invention relates to tone process of image and is capable of improving output quality of image for better contrast and color saturation. In an RGB image, the color is created with red, green and blue lights as three additive primaries. It becomes dark when no light added. Each primary light gives color. More lights give higher brightness, and the utmost is white. In other words, higher tone scale value gives higher brightness. According to the effect of semi-S curve for tone process, we will enhance the contrast at both shadow color portion and light color portion of the image. That means, to process the tone scales with the semi-S curve to decrease the tone values of the original image at the shadow color portion, and increase the tone values of the original image at the light color portion. Meanwhile, the relative level of the RGB image will be increased. Therefore, the contrast of brightness and saturation of color of an image output can be improved.

To achieve the aforesaid objects, the semi-S curve is composed of shadow-color enhancement curve O-TP and a light-color enhancement curve TP-E linked at a transition point TP. The semi-S curve crosses the original curve (a straight line) at the point TP. The shadow-color enhancement curve O-TP lies under the original curve and has maximum offset point $P_1$. The vertical distance $D_1$ from the offset point $P_1$ to the original curve is called the maximum downward offset. The light-color enhancement curve TP-E lies beyond the original curve and has maximum offset point $P_2$. The vertical distance $D_2$ from the offset point $P_2$ to the original curve is called the maximum upward offset. Therefore, starting from the tone scale value N of the transition point TP, the semi-S curve process enhances shadow colors to the pixels that have tone scale values smaller than N; and enhances light colors to the pixels that have tone scale values larger than N.

The following description is an example of processing an RGB image of 8-bit color (with tone scale values 0~255) by analyzing the histogram of tone scale of the image and deciding a semi-S curve for the process. The processing steps are:

a) using the analyzed data distribution of the image to decide a transition point TP for the semi-S curve;
b) deciding the shadow-color enhancement curve O-TP of the semi-S curve locating before the transition point TP;
c) deciding the light-color enhancement curve TP-E of the semi-S curve locating after the transition point TP.

Figure 3:
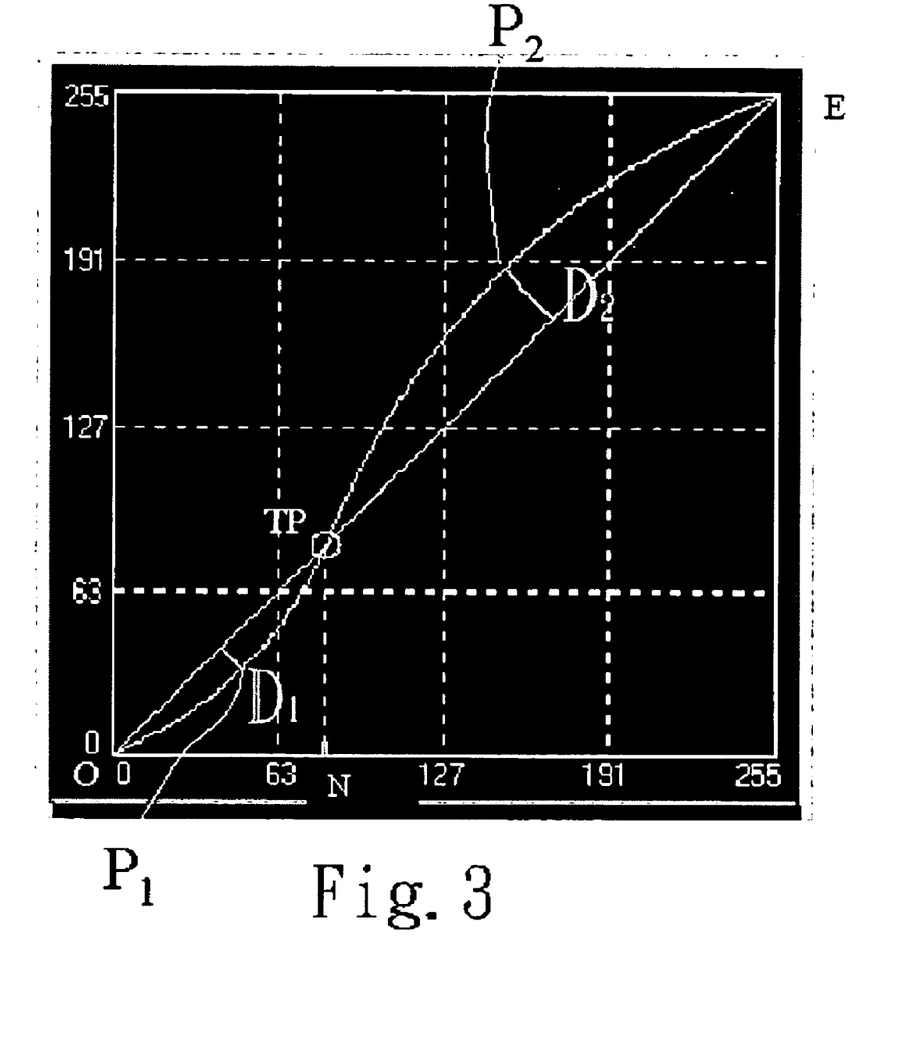
FIG. 3 is a diagram showing location of a transition point TP of a semi-S curve.

In step a), the RGB histogram of tone scale is first made, in which the samples probability $F_n$ (n=0~255) of RGB pixel samples locating in each tone scale (0~255) are summarized. Then, the samples of RGB pixel samples from the darkest level (tone scale 0) are added till the sum of samples probability $\Sigma F_n$ (n=0~n) reaches a value of 1/P, called "transition point parameter", determined by the user. P is a positive number less than one. Based on the parameter P, the position of transition point TP, as shown in FIG. 3, for generating the semi-S curve can be determined accordingly.

The aforesaid samples probability $F_n$ is the sum of samples probability of RGB pixels locating in a certain tone scale position (0~255). For example, if the image has 400 thousand pixel samples totally, and the R, G, B color pixel samples in tone scale 64 are 300, 400 and 570 respectively, then the samples probability $F_{64}$ is calculated as follows:

$$F_{64}=(300/400000)+(400/400000)+(570/400000)=0.003175$$

In other words, the samples probability $F_n$ is the ratio of pixel sampling numbers in that specific tone scale value n to the total pixel samples of an image.

In step b), the present invention takes summation of the samples probability $F_n$, starting from $F_0$ (samples probability of tone scale 0) to $F_{N/2}$ (samples probability of tone-scale N/2) where N is the tone scale position of the transition point TP. For example, if N=100, then N/2=50. If the sum of samples probability $F_0$ to $F_{N/2}$ equals $F_L$, i.e., $\Sigma F_n$ (n=0~(N/2))=$F_L$ then the maximum downward offset $D_1$ of a maximum downward offset point $P_1$ can be calculated as follows:

$$D_1 = C_1 (2PF_L - 1) \text{ when } 2PF_L - 1 < 0,$$

and $$D_1 = O \text{ when } 2PF_L - 1 > 0$$

Figure 4:
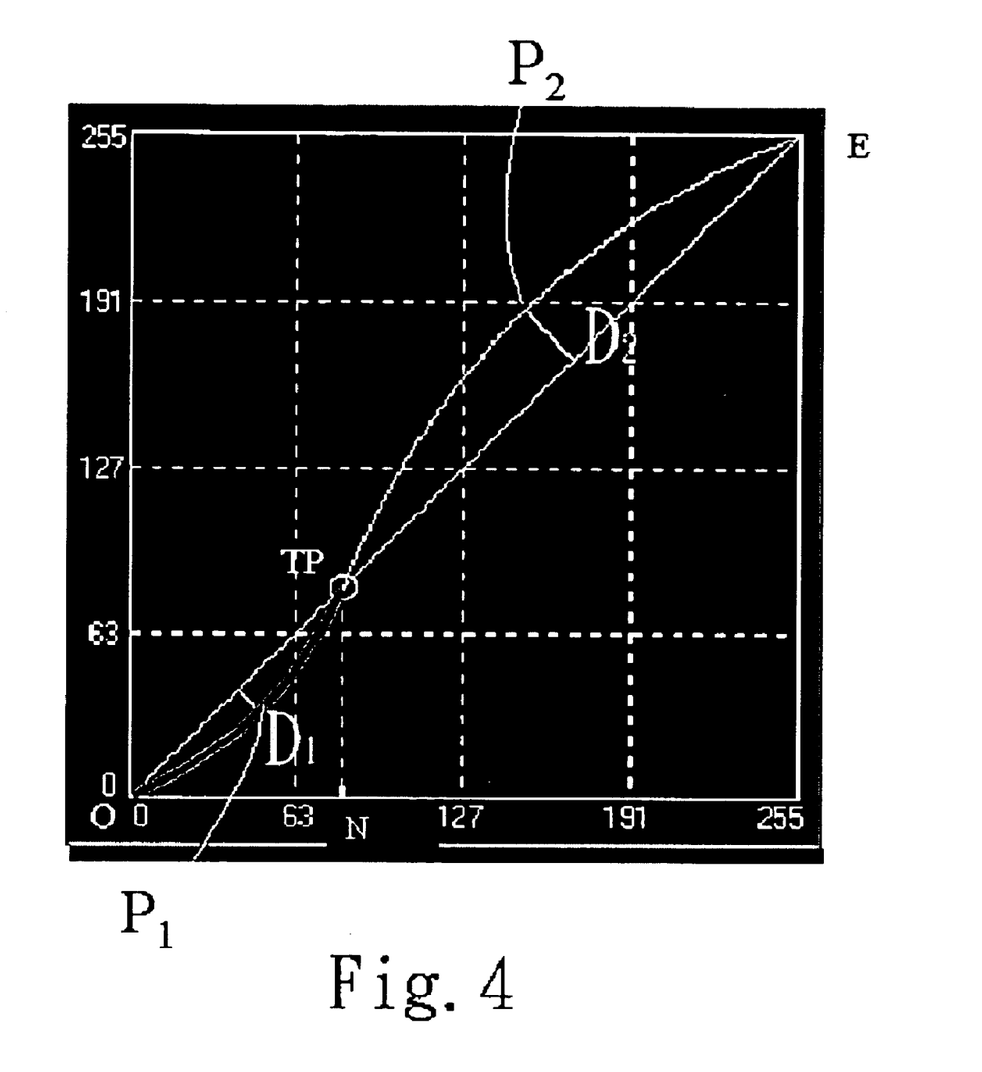
FIG. 4 is a diagram showing location of a shadow portion color enhancement curve in a semi-S curve.

Then, we can find out the function and line of the shadow portion color enhancement curve O-TP (as shown in FIG. 4) according to the origin (0,0), the transition point TP (N,N) and the maximum downward offset value $D_1$. In the above formula, $C_1$ is a shadow portion color enhancement constant (positive number). For example, $C_1$=N in the embodiments of FIGS. 7A~10C. And $2PF_L - 1$ is a parameter for sufficiency of shadow portion color. $2PF_L - 1 > 0$ means shadow portion color is sufficient without the need of further enhancement.

In step c), the present invention takes summation of the samples probability $F_n$, starting from $F_{(N+255)/2}$ (samples probability of tone-scale (N+255)/2) to $F_{255}$ (samples probability of tone-scale 255) where N is the tone scale of the transition point TP. If the sum of samples probability $F_{(N+255)/2}$ to $F_{255}$ equals $F_2$, i.e., $\Sigma F_n$ (n=(N+255)/2~255)=$F_L$, then the maximum upward offset $D_2$ of a maximum upward offset point $P_2$ can be calculated as follows:

$$D_2 = C_2 (1 - 2PF_H)P - 1) \text{ when } (1 - 2PF_H - 1 > 0,$$

and $$D_2 = 0 \text{ when } (1 - 2PF_H)/(P-1) < 0$$

In which, $c_2$ is a light portion color enhancement constant (positive number). For example, $C_2$=255−N in the embodiments of FIGS. 7A~10C. And, $(1-2PF_H)/(P-1)$ is a parameter for sufficiency of light portion color. $(1-2PF_H)/(P-1)<0$ means light portion color is sufficient without the need of further enhancement.

Figure 5:
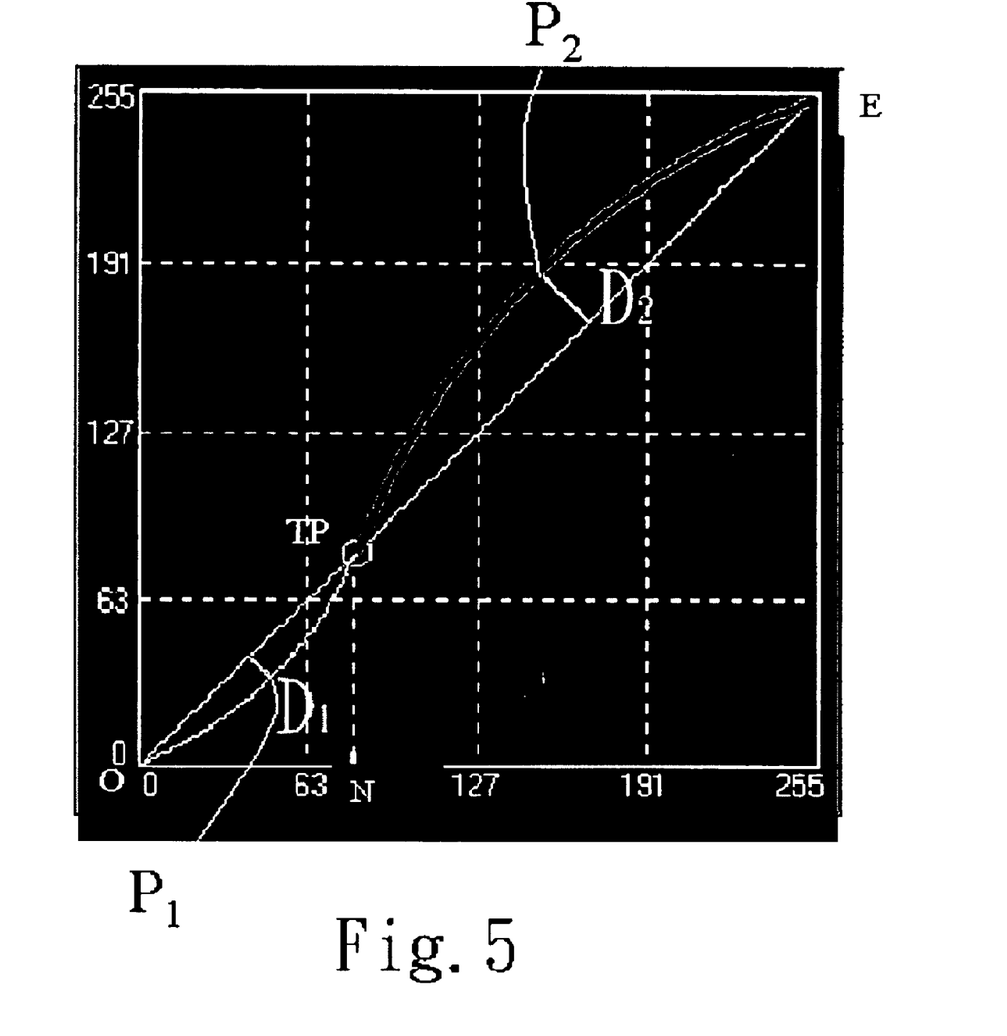
FIG. 5 is a diagram showing location of a light portion color enhancement curve in a semi-S curve.

In the same way, we can find out the function and line of the light portion color enhancement curve TP-E (as shown in FIG. 5) according to the end point (255, 255), the transition point TP (N, N) and the maximum upward offset value $D_2$.

Figure 6:
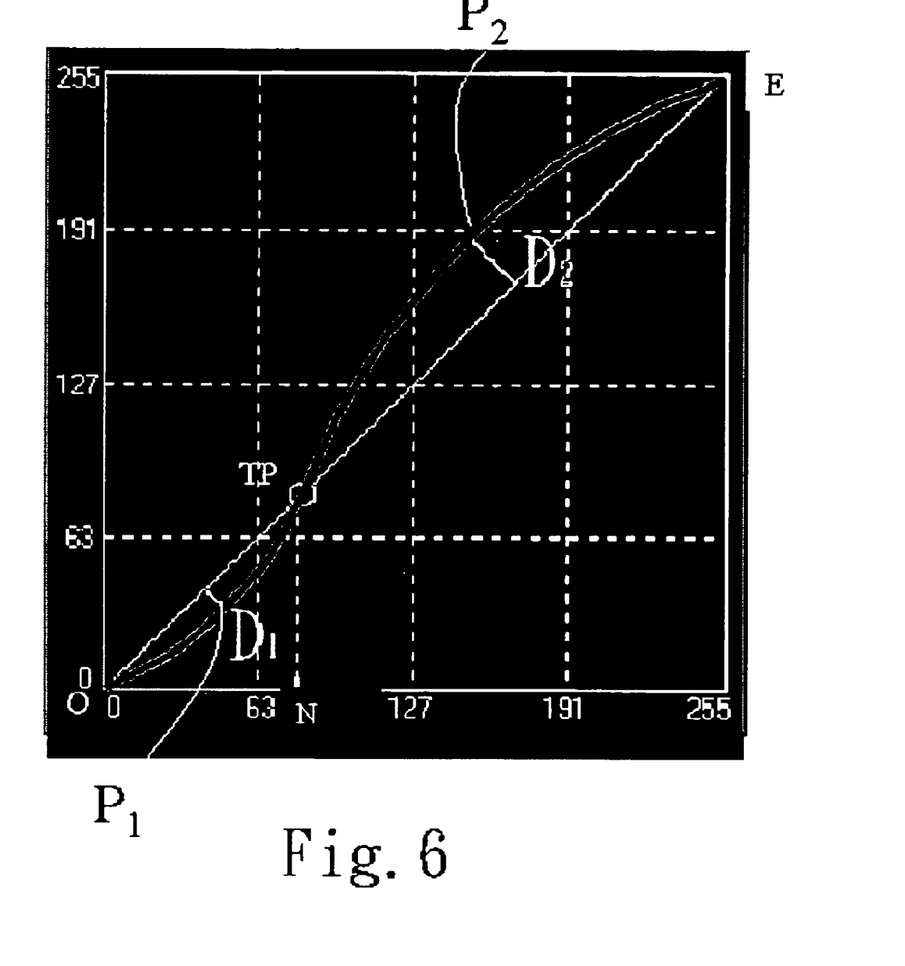
FIG. 6 is a diagram showing composition of a semi-S curve by a shadow portion color enhancement curve and a light portion color enhancement curve.
Figure 7A:
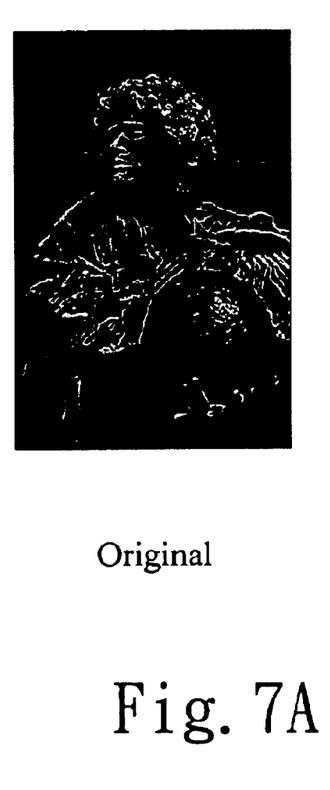
FIGS. 7A~7C are application examples of the present invention showing respectively an original image of stone status and images processed through tone scale process with transition point parameters TP=2 and TP=3.
Figure 7B:
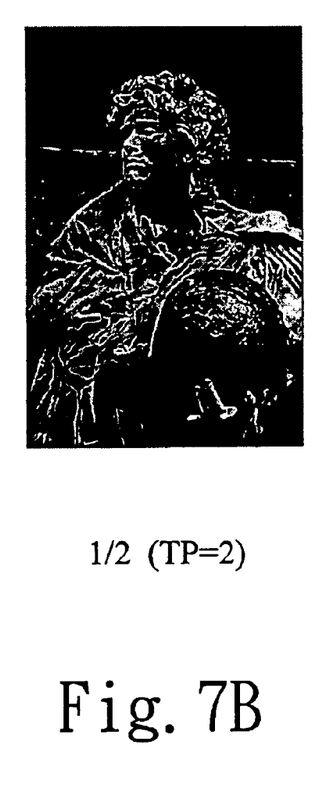
Figure 7C:
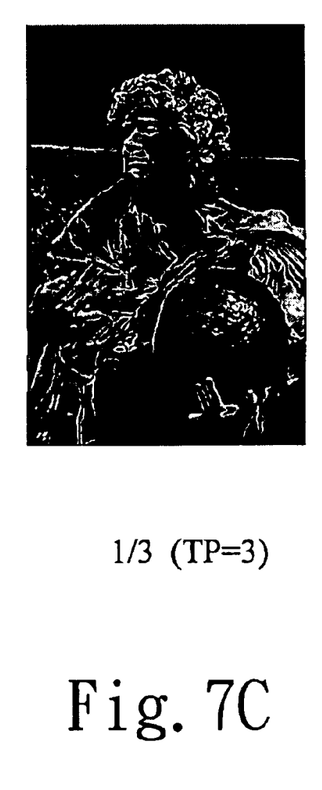
Figure 8A:
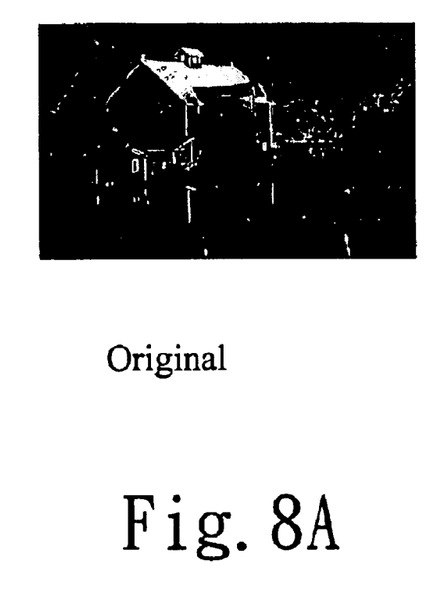
FIGS. 8A~8C are further application examples of the present invention showing respectively an original image of scenery and images processed through tone scale process with transition point parameters TP=2 and TP=3.
Figure 8B:
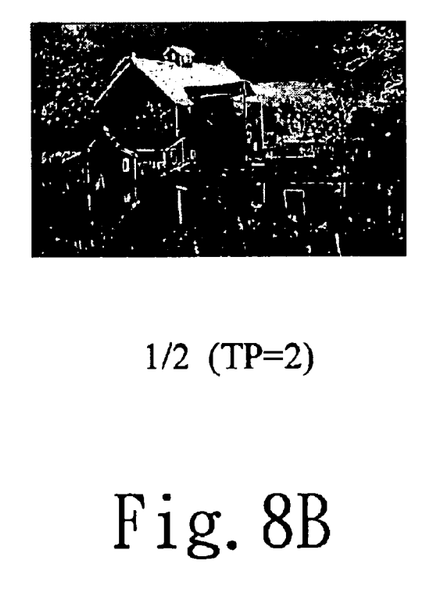
Figure 8C:
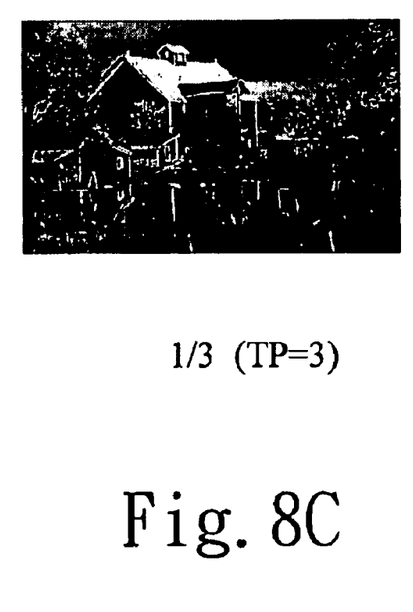
Figure 9A:
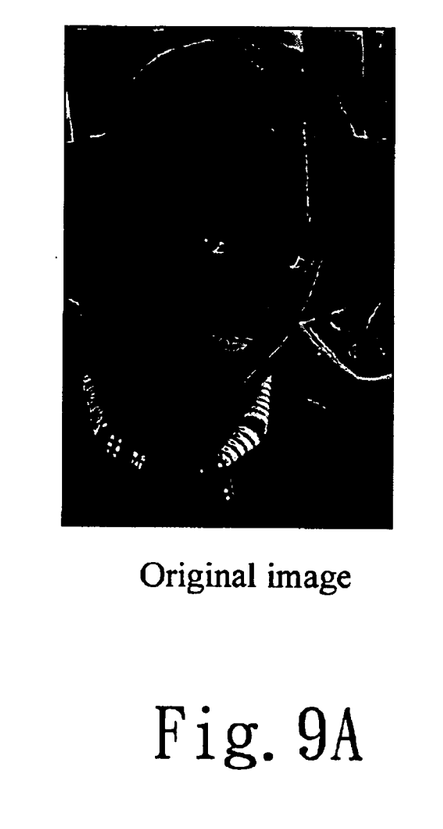
FIGS. 9A~9C are further application examples of the present invention showing respectively an original image of people and images processed through tone scale process with transition point parameters TP=2 and TP=3.
Figure 9B:
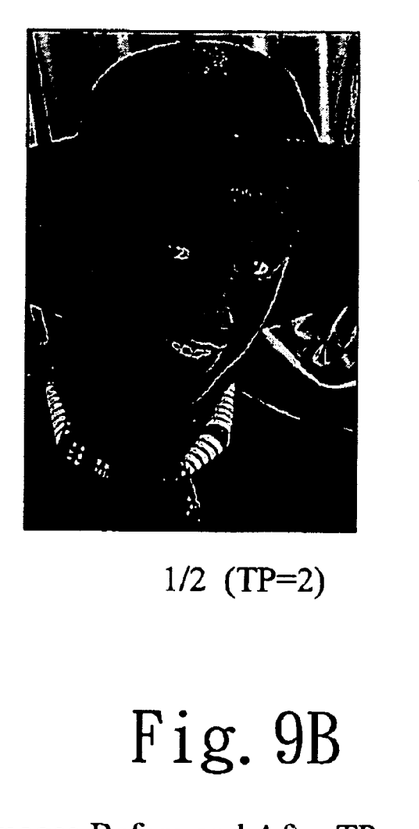
Figure 9C:
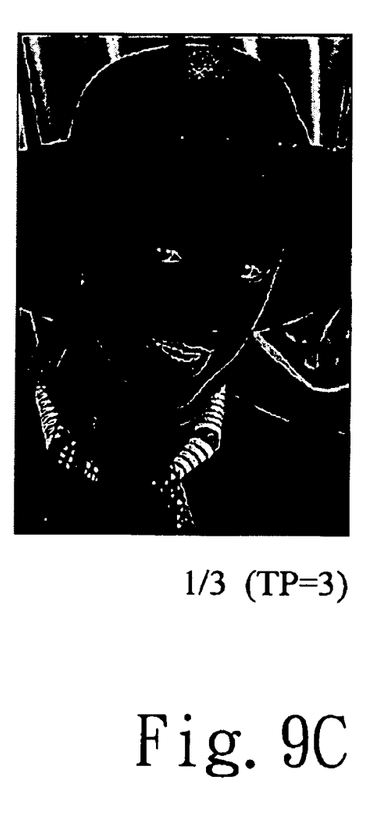

As shown in FIG. 6, we can compose the shadow portion color enhancement curve O-TP and the light portion color enhancement curve TP-E into a semi-S curve for tone scale process. In FIG. 7A, an original image is shown. A semi-S curve is determined by the aforesaid steps and used to process the image. When the P value is set to 2 and 3 respectively, the processed images are shown in FIGS. 7B and 7C where the brightness contrast and the color saturation are obviously improved. The same processes are applied to images of people as shown in FIGS. 8A~8C, and images of scene as shown in FIGS. 9A~9C. Here we can see that suitable adjustments can be taken for desired results by the semi-S curve tone processes.

Figure 10A:
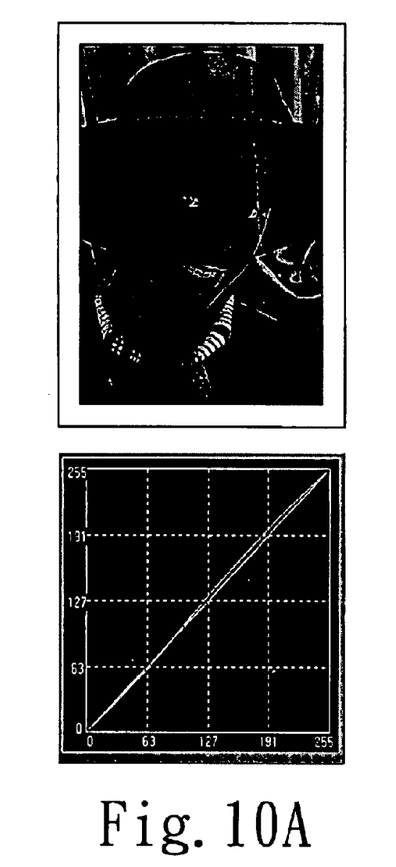
FIGS. 10A~10C are comparative images having same contents but with different single-color larger areas and without single-color larger area, and their semi-S curves showing the differences among them.
Figure 10B:
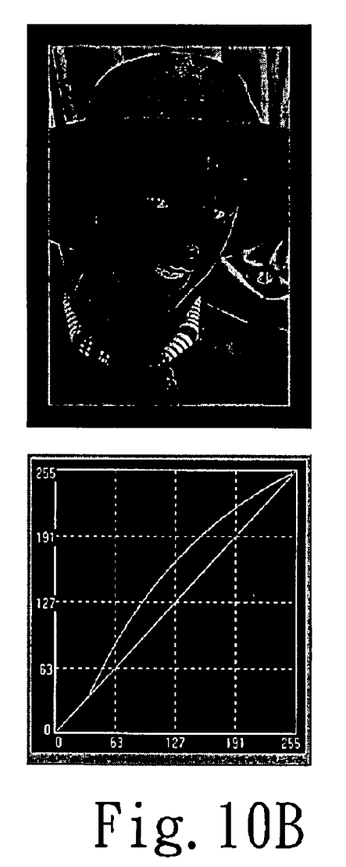
Figure 10C:
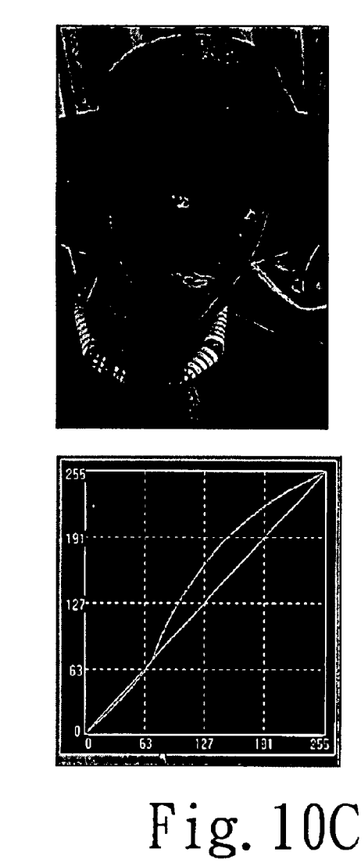

But, in practice, there may be some single-color larger areas locating in the image, also called as high occurrence color, that will influence the shape of the semi-S curve. For example, three images having mainly same contents are shown in FIGS. 10A~10C. The image of FIG. 10A has a larger white patch area in the boundary. The image of FIG. 10B has a larger black patch area in the boundary. And, no larger single color area is located in the image of FIG. 10C. According to principle of this invention, the semi-S curves decided from the three images should be the same, at least extreme similar. But, actually they much differ from each other as shown in the figures due to the existence and different colors of the larger single color areas. On the contrary, human eyes can easily eliminate this kind of difference occurring from high occurrence color.

In order to solve the aforesaid problem, we can add a weighting procedure before the step a) for compensating the high occurrence color effect, and rearrange the histogram of tone scale, so as to decrease the influence of the single-color larger area to the calculation and process of tone scale.

Figure 11:
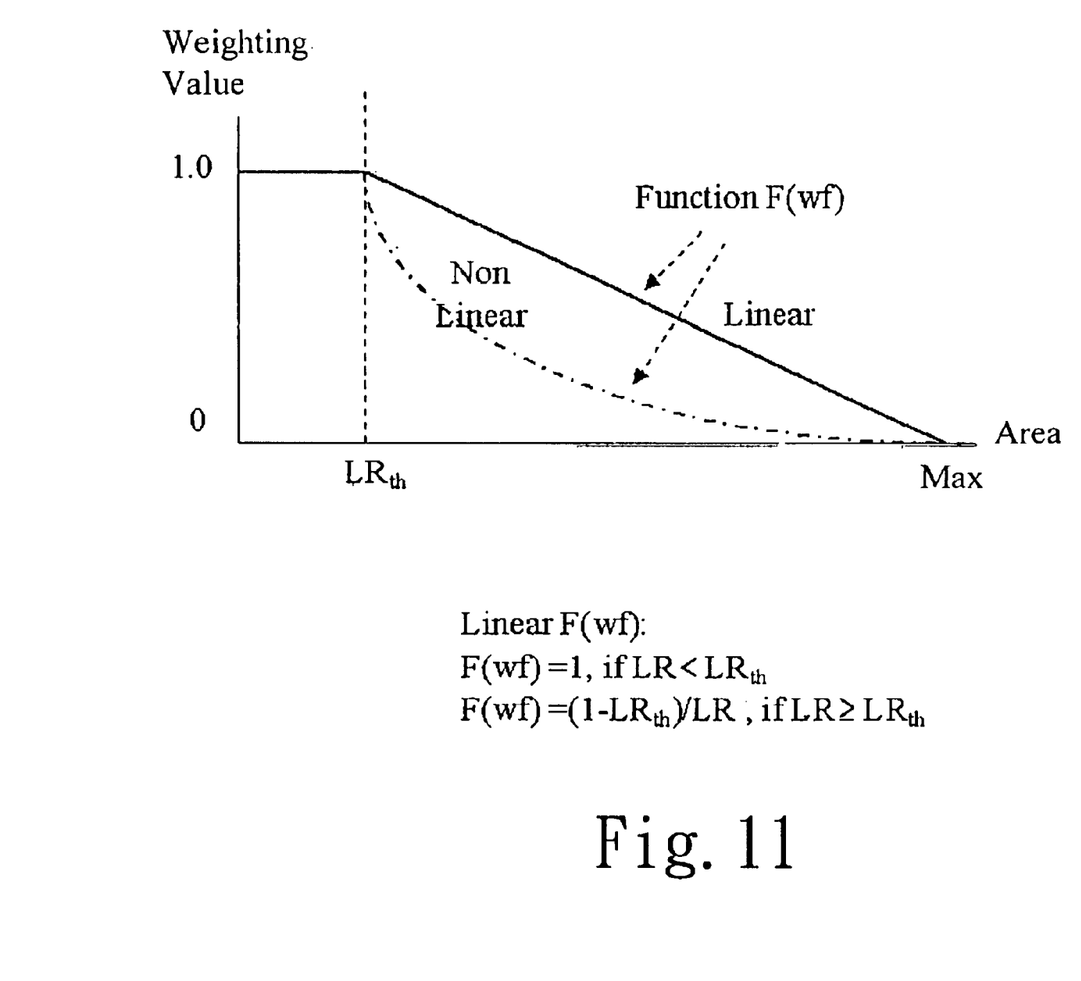
FIG. 11 is a relationship diagram showing a linear or non-linear relationship between the area of single-color larger area and the weighting value (the high occurrence color weighting value).

The step of the weighting procedure is to analyze the histogram, find out the larger area of single color (the area with the same or similar tone scale), and multiply the area LR with a weighting value $F(W_f)$. The weighting value $F(W_f)$ can be a linear or non-linear decreasing function curve relative to the area as shown in FIG. 11, in which the horizontal axis is the area of single-color, while the vertical axis is the weighting value. By the weighting process, the samples probability of tone scale can be recalculated, and a histogram considering the weighting will be changed.

First, we determine a threshold $LR_{th}$ for judgement of larger area of high occurrence color. The unit for the area can be samples number of each tone scale (0~255) or the samples probability $F_n$ of each tone scale (n=0~255). Those area smaller than the threshold $LR_{th}$ will get a weighting value "1". That area larger than the threshold $LR_{th}$ will get a weighting value between 0 to 1. That is, the weighting value for the largest area is 0. The rest are set with values between 0 and 1 according to the size of areas in a relationship of linear or non-linear decreasing. A non-linear relationship can be set by the user. A linear mapping can be determined as follows.

| Linear $F(W_f)$: | |
| --- | --- |
| $F(W_f) = 1$ | when $LR < LR_{th}$, and |
| $F(W_f) = 1 - (LR-LR_{th})/(1-LR_{th})$ | when $LR \geq LR_{th}$ |

There may be a large number of pixels with same tone scale in an image, but different tone scale pixels may evenly located everywhere in the image, and the areas of different tone scales may not differ too much from each other. Supposing the pixels for each tone scale 0~255 are the same and each occupies 1/256 of the total area, then, there is no need for the weighting process of larger area. Therefore, the threshold $LR_{th}$ should be larger than 1/256, and practically, be set to 1/20, 1/10 or even larger, so as to show the tone process result of decreasing influence of high occurrence color due to larger single-color area.

Figure 1:
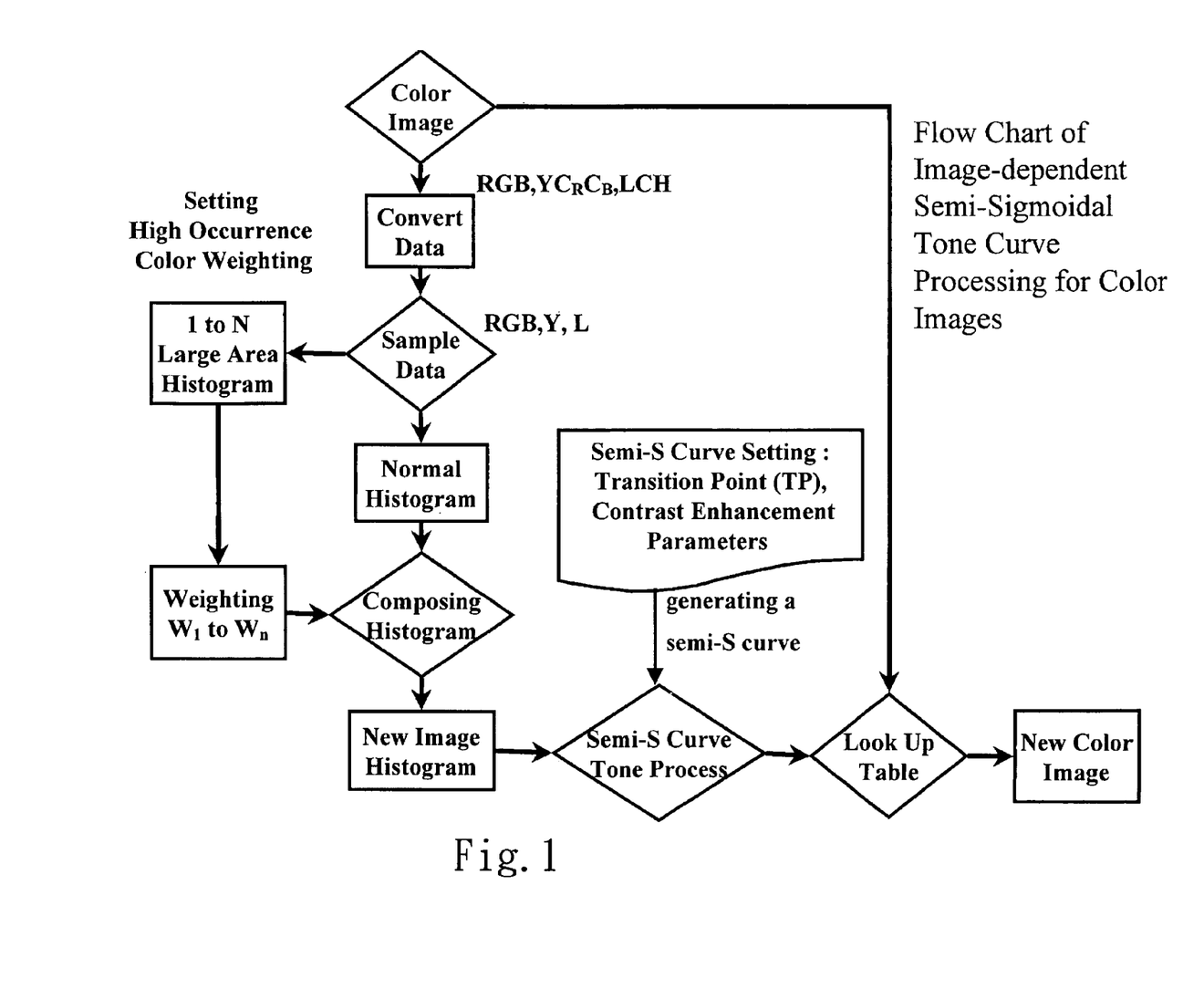
FIG. 1 is a block diagram of a Semi-S curve colortone processing device.

The method of the present invention can be accomplished and embodied through software incorporated in an image-processing program, as shown in FIG. 1, or incorporated directly into firmware of a digital image output device.

The tone scale process according to the present invention can accommodate to the tone scale histogram of the specific image, and find out a suitable semi-S curve for the tone scale process. In comparison to conventional process methods, the present invention can obtain better results of contrast of brightness and saturation of color for every different image.

For those high occurrence colors existing in the digital image, the present invention provides a weighting process to rearrange and analysis the histogram of the image and to eliminate the influence of high occurrence color to the tone scale process.

Therefore, the present invention provides a tone scale process method that decides a suitable semi-S curve for improving the brightness contrast and color saturation for a digital image. The semi-S curve accommodates to the contents of the image for better image quality results. A weighting process is also applicable to eliminate the influence of high occurrence color to the tone scale process. So that, the image output devices can generate images with good quality.

Though the aforesaid embodiments are based on an RGB image, the other color systems, such sRGB (standard RGB); LCH, CIE Lab, Munsell coordinates; $YC_rC_b$ and Luv, are also applicable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for deciding a semi-S curve for processing tone scale of a digital image, comprising steps of:
    a) analyzing tone scale distribution of said image to decide a weighting value of high occurrence color;
    b) analyzing tone scale of said image and deciding a transition point TP for the semi-S curve through steps of: making a histogram of tone scale, making summation of samples probability $F_n$ (n=0~Mg, in which Mg is a maximum tone scale value of the image format) of pixel sample number locating in each tone scale (0~Mg), making a summation of samples probability of image from the darkest level (tone scale 0) till the sum $\Sigma F_n$ (n=0~N) reaching a value of 1/P, in which P is a predetermined parameter, and obtaining the position of transition point TP at the tone scale N;
    c) deciding a shadow portion color enhancement curve O-TP of the semi-S curve locating before the transition point TP, the curve O-TP passing through origin point O(0, 0), the transition point TP and a maximum downward offset point determined by a maximum downward offset $D_1$ calculated as follows:

$D_1=C_1 (2PF_L)-1)$ when $(2PF_L-1<0$, and $D_1=0$ when $(2PF_L)-1 \geq 0$ in which $F_L=\Sigma F_n$ (n=0~(N/2)), $C_1$ is a predetermined constant; and
    d) deciding a light portion color enhancement curve TP-E of the semi-S curve locating after the transition point TP, the curve TP-E passing through an end point, the transition point TP and a maximum downward offset point determined by a maximum upward offset $D_2$ calculated as follows:

$D_2=C_2 (1-2PF_H)/(P-1)$ when $(1-2PF_H-1>0$, and $D_2=0$ when $(1-2PF_H)/(P-1<0$ in which $F_H=\Sigma F_n$ (n=(N+Mg)/2~Mg), $C_2$ is a predetermined constant;
    whereby, the semi-S curve composed of the curve O-TP and the curve TP-E is obtained.

2. A method for deciding a semi-S curve for processing tone scale of a digital image according to claim 1 wherein said histogram of tone scale is a bar chart of each tone, in which the horizontal axis shows the tone value (0~Mg), while the vertical axis shows the amount of pixel samples for each tone in the image.

3. A method for deciding a semi-S curve for processing tone scale of a digital image according to claim 1 wherein said samples probability $F_n$ is a summation of pixel samples of tone-scale n.

4. A method for deciding a semi-S curve for processing tone scale of a digital image according to claim 3 wherein said pixel samples of image are RGB pixels.

5. A method for deciding a semi-S curve for processing tone scale of a digital image according to claim 3 wherein said pixel samples of image are standard RGB pixels.

6. A method for deciding a semi-S curve for processing tone scale of a digital image according to claim 3 wherein said pixel samples of image are $YC_rC_b$ pixels.

7. A method for deciding a semi-S curve for processing tone scale of a digital image according to claim 3 wherein said pixel samples of image are Luv pixels.

8. A method for deciding a semi-S curve for processing tone scale of a digital image according to claim 3 wherein said pixel samples of image are LCH pixels.

9. A method for deciding a semi-S curve for processing tone scale of a digital image according to claim 3 wherein said pixel samples of image are in CIE Lab or Munsell system.

10. A method for deciding a semi-S curve for processing tone scale of a digital image according to claim 1 wherein said parameter P is a positive number less than one.

11. A method for deciding a semi-S curve for processing tone scale of a digital image according to claim 1 wherein said transition point locates on an intersection point of the semi-S curve and a 45° line passing through said origin as an original curve.

12. A method for deciding a semi-S curve for processing tone scale of a digital image according to claim 11 wherein said image is in RGB system, said shadow portion color enhancement curve locating under said original curve includes a maximum downward offset point vertically deviating from said original curve with a maximum downward offset $D_1$.

13. A method for deciding a semi-S curve for processing tone scale of a digital image according to claim 11 wherein said image is in RGB system, said light portion color enhancement curve locating beyond said original curve includes a maximum upward offset point vertically deviating from said original curve with a maximum upward offset $D_2$.

14. A method for deciding a semi-S curve for processing tone scale of a digital image according to claim 1 wherein coordinate of said transition point TP is (N,N).

15. A method for deciding a semi-S curve for processing tone scale of a digital image according to claim 1 wherein coordinate of said end point of the light portion color enhancement curve is (Mg, Mg).

16. A method for deciding a semi-S curve for processing tone scale of a digital image according to claim 1 wherein said step a) further comprises steps of: weighting those high occurrence colors in said image, which larger areas of single color or extreme similar color value, and rearrange and analysis the histogram of tone scale.

17. A method for deciding a semi-S curve for processing tone scale of a digital image according to claim 16 wherein said step of weighting high occurrence color is to analyze the histogram, find out larger area of single color, multiply the area LR with a weighting value $F(W_j)$, and rearrange a histogram according to the multiplication result.

18. A method for deciding a semi-S curve for processing tone scale of a digital image according to claim 16 wherein said weighting value $F(W_f)$ is decided on a threshold $LR_{th}$ for judging larger area which meets high occurrence condition, so that area smaller than the threshold $LR_{th}$ will get a weighting value "1", while area larger than the threshold $LR_{th}$ will get a weighting value between 0 to 1.

19. A method for deciding a semi-S curve for processing tone scale of a digital image according to claim 18 wherein said weighting value $F(W_f)$ is linearly decreased according to the area LR as follows:

$F(W_f)=1$ when $LR<LR_{th}$, and $F(W_f)=1-(LR-LR_{th})/(1-LR_{th})$ when $LR \geq LR_{th}$.

20. A method for deciding a semi-S curve for processing tone scale of a digital image according to claim 18 wherein said weighting value $F(W_f)$ is non-linearly decreased according to the area LR.

* * * * *